March 17, 1936.  W. H. PETIT ET AL  2,034,441
ART OR METHOD OF ACCURATELY PHOTOGRAPHING UPON
FILM STRIPS HAVING NONSENSITIZED ENDS
Filed May 2, 1934   5 Sheets-Sheet 2
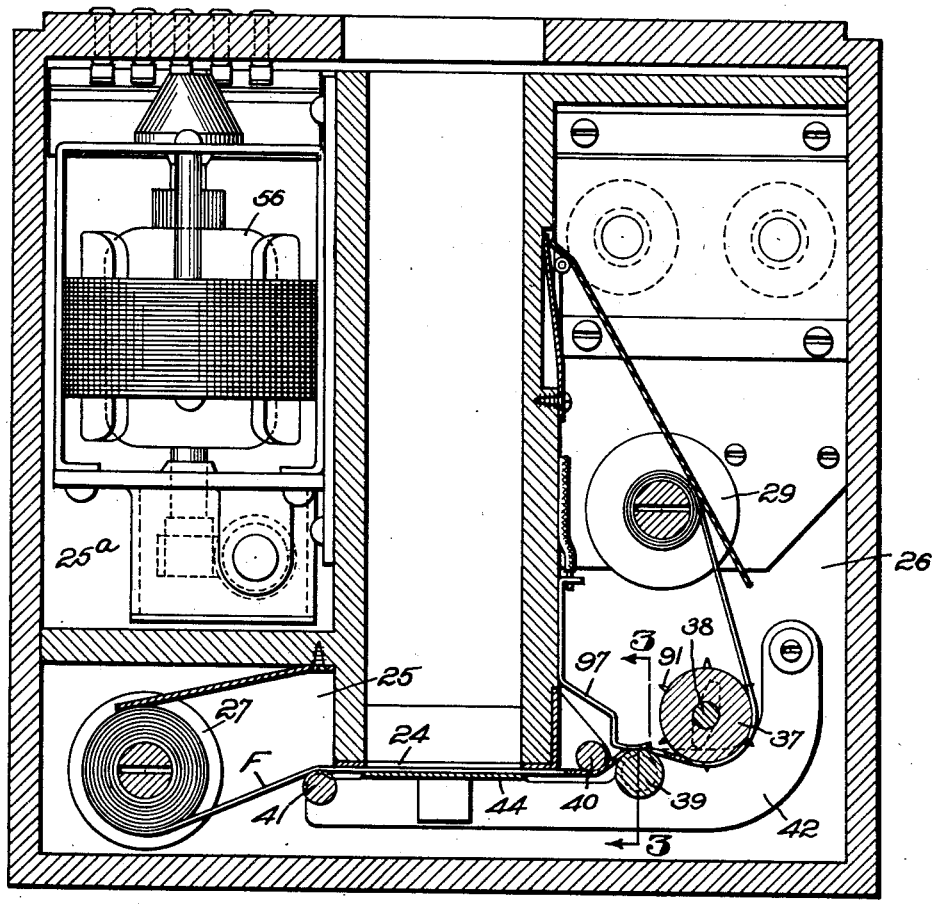
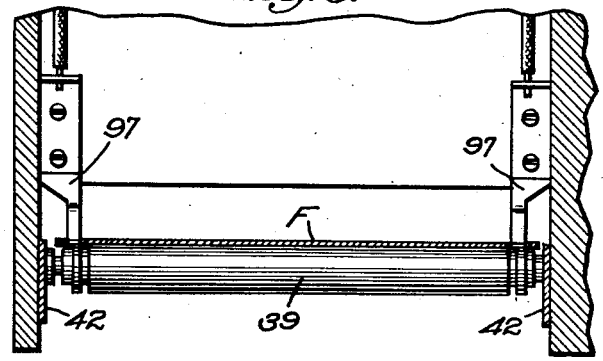

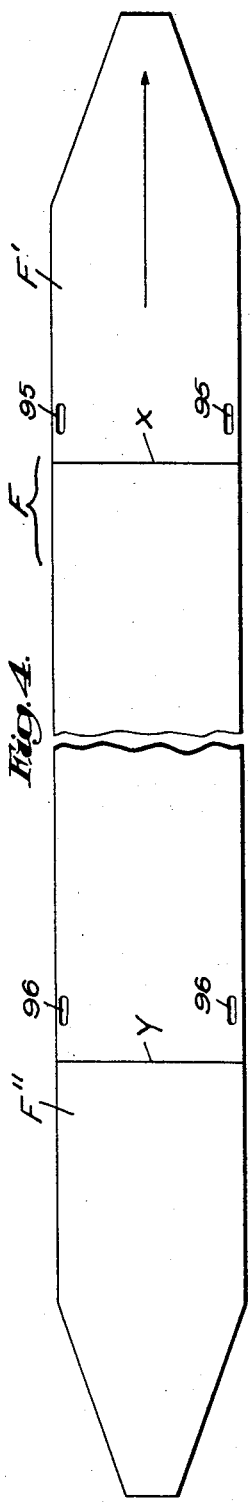
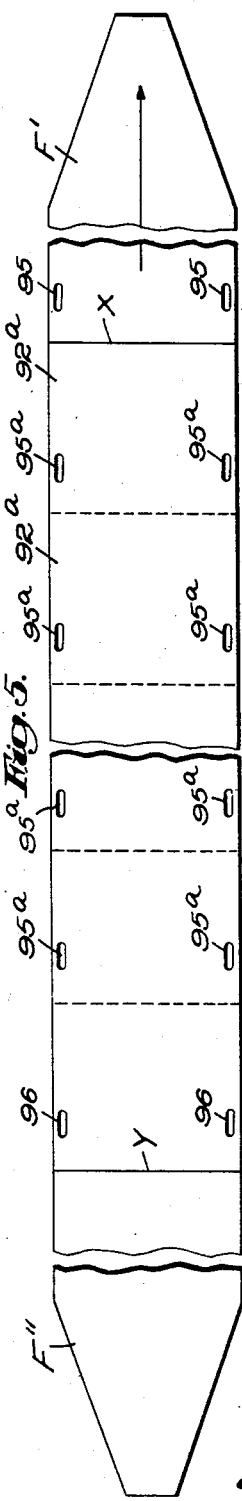
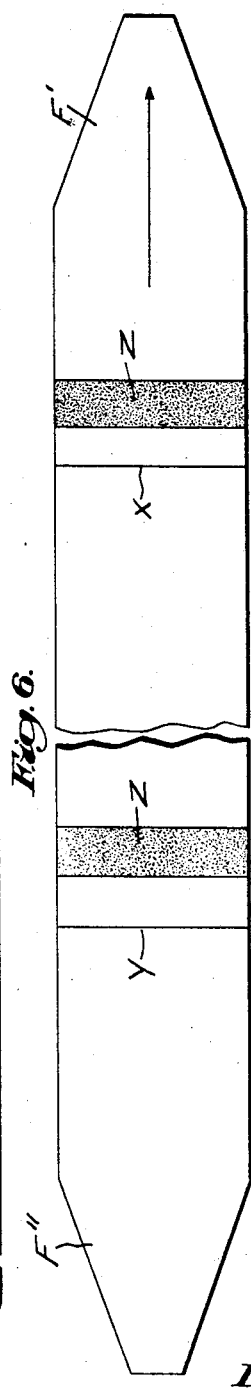
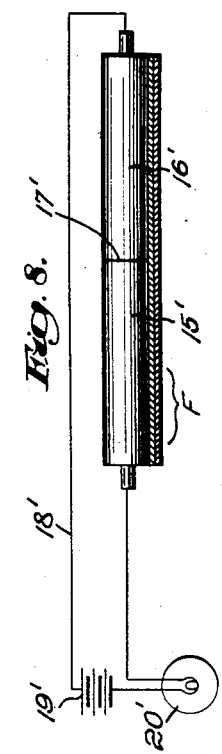
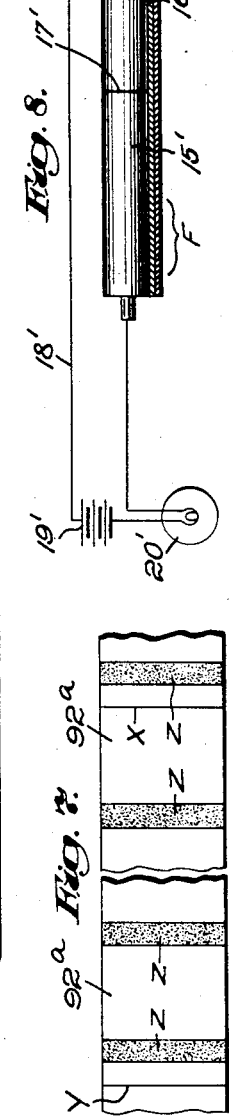

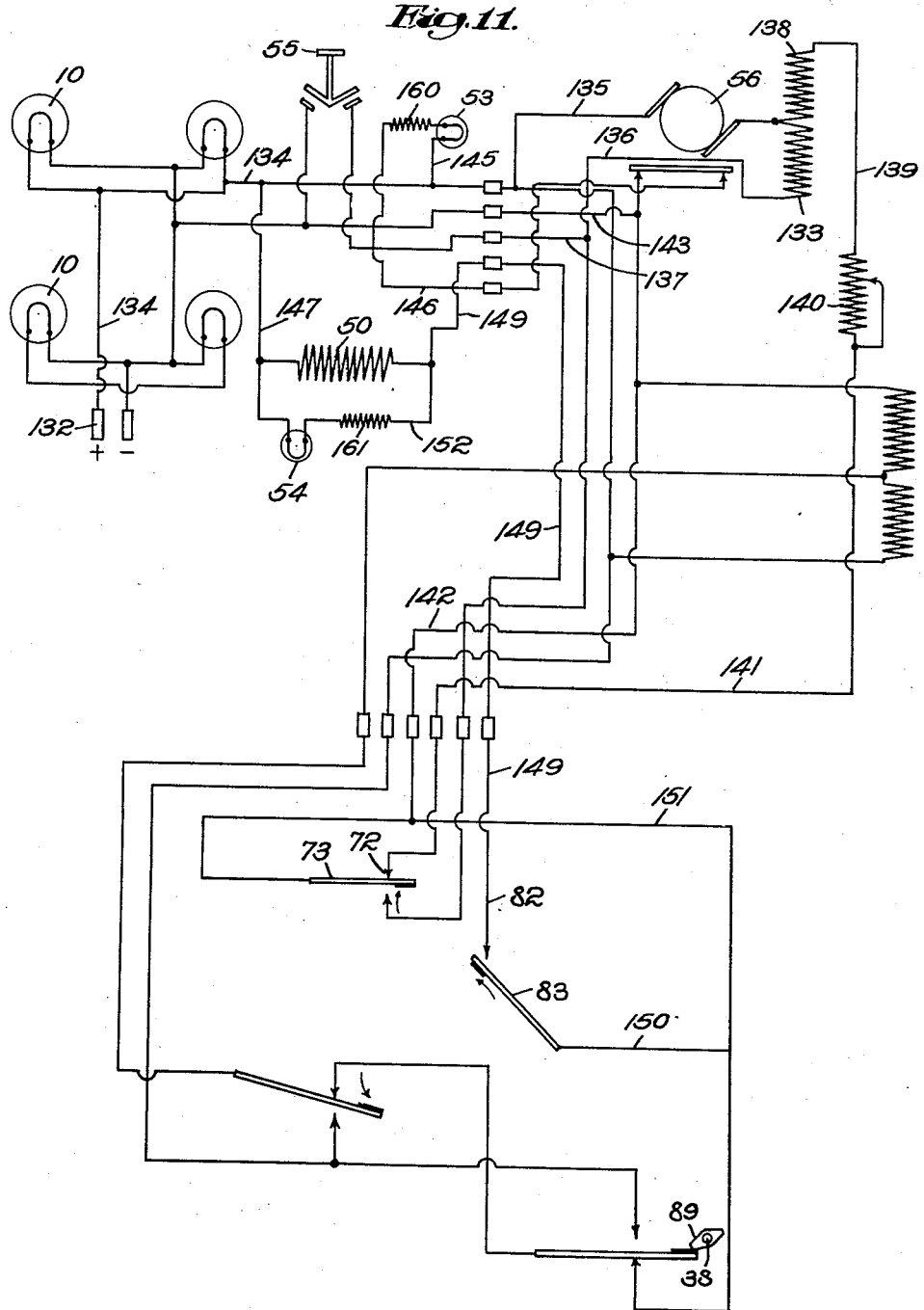

Patented Mar. 17, 1936

2,034,441

UNITED STATES PATENT OFFICE 2,034,441

ART OR METHOD OF ACCURATELY PHOTOGRAPHING UPON FILM STRIPS HAVING NONSENSITIZED ENDS

William H. Petit, Dayton, Ohio, and Edson S. Hineline, Rochester, N. Y., assignors to Folmer Graflex Corporation, Rochester, N. Y., a corporation of Delaware Application May 2, 1934, Serial No. 723,524

8 Claims. (Cl. 177—311)

This invention relates to the art or method of accurately photographing upon film strips having non-sensitized ends, and may be practised with that type of camera shown in our co-pending application Ser. No. 586,919, now Patent No. 1,963,095, June 19, 1934, through the use of the sensitized film strip with non-sensitized leader and trailer ends claimed in our co-pending application Ser. No. 715,107, now Patent No. 1,963,096. Our method may, however, be practised with other types of cameras by the employment therein of the sensitized film disclosed in said Patent No. 1,963,096.

In order that the principle of the present invention may be readily understood, we have sufficiently disclosed in the accompanying drawings portions of the camera of said application Ser. No. 586,919 to make clear how our method is practiced thereby, and have also shown certain embodiments of the sensitized strip of our invention, by the cooperation of which with the camera our method is practiced. To avoid excessive illustration, we do not illustrate other types of cameras by which our invention may be practiced, but it will be understood from the following description that very many radically different types of cameras may be employed by providing the same with an electric circuit having a signal and terminals or contact members to be governed by a structural variation of the film.

In the said drawings,—

Fig. 2 is a vertical section taken through the so-called magazine body or box of the camera and upon which the hood portion of the camera rests;

Fig. 3 is a detailed fragmentary vertical section on the line 3—3 of Fig. 2 and looking in the direction of the arrows in said figure, to show the sensitized film drive roll controlling certain electrical connections;

Fig. 4 is a plan view, partly broken away, of one embodiment of sensitized film strip provided with structural variations in the form of openings used in carrying out our method;

Fig. 5 is a similar view of a slightly modified embodiment of the said sensitized film strip shown in Fig. 4;

Fig. 6 is a view similar to Fig. 4 but showing still another embodiment of the sensitized strip, provided with conductor areas instead of openings;

Fig. 7 is a detail in plan view of a sensitized film strip similar to that shown in Fig. 6, but provided with a conductor at each picture area;

Fig. 8 is a diagrammatic view, partly in transverse section, through the sensitized film strip, to indicate the electric circuit controlled thereby;

Fig. 11 is a diagram of the general circuit arrangements of the camera.

Figure 1:
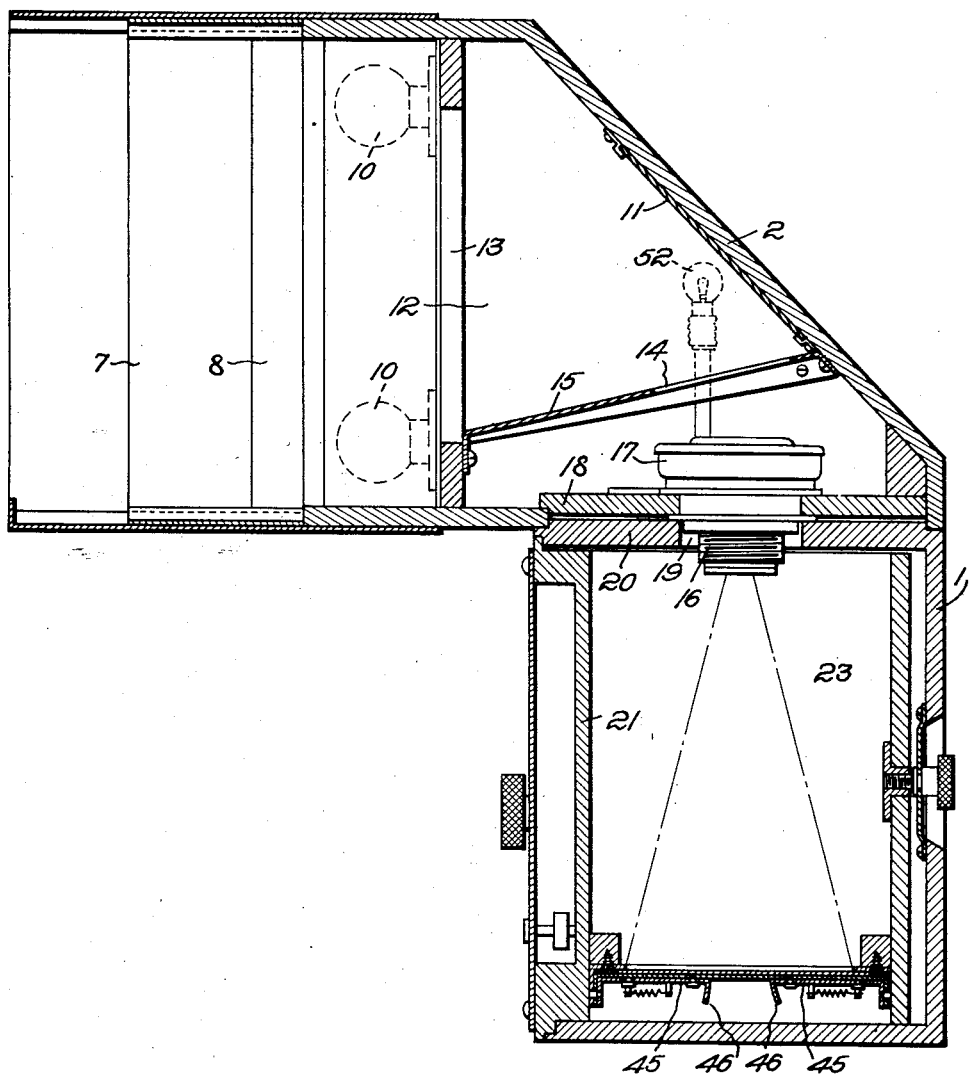
Fig. 1 is a vertical section taken through the camera and through the controlling sensitized strip therein.

In order to make clear our method of accurately photographing upon film strips having non-sensitized ends, and particularly by a camera of the type shown in our Patent No. 1,963,095, we will first refer to one way by which we may carry out the method of our invention with said camera, and which is merely illustrative of the various uses to which the said type of camera may be put. Without attempting to enumerate all the uses of the invention, we will particularly refer to that use which is described in our said co-pending applications, now Patents Nos. 1,963,095 and 1,963,096, namely, the making of photographic records of the reading of meters in telephone exchanges. Such camera is electrically operated, being suitably connected at a proper voltage with an available source of electrical energy, as, for example, an electric storage battery associated with all telephone exchanges. Such camera carries its own illumination for the objects, namely, the meter dials, in the way of suitable lamps preferably continuously lighted while the camera is hooked up to the circuit by means of a flexible cord that enables the operator of the camera to carry or advance the same from one group of meters to another group throughout the entire telephone exchange. The sensitized film, more fully hereinafter described, is loaded into the camera and is preferably automatically advanced until, under the control of the said film itself, a white signal light flashes on and off. Such signal indicates that the film is in position for exposures of the sensitized surface thereof lengthwise said film. The operator of the camera then simply holds the camera to a group of the meters and presses an operating button controlling a contained motor driving a cycle member. Said member acts first to open and then to close the shutter that makes the proper exposure upon one picture area of the sensitized film strip. The operator is informed by the illumination of a red signal light, visible at the rear of the camera, of the duration of this exposure, so that he will not remove the camera from its position against one bank or group of meters until the shutter is closed again.

Without further manual effort, the cycle member then automatically winds the sensitized strip to the extent of one exposure area, whereby a new picture area is presented in the field of exposure. This winding occurs very rapidly and is ordinarily accomplished while the camera is being moved from one object or meter to the next. When the picture receiving area of the film has been completely wound off, the white signal light is again illuminated, advising the operator of this condition. The sequences of exposure, winding of the film, and subsequent exposure, being thus automatically accomplished, there is no danger of double exposure, and should the operator present the camera to the next bank or group of meters before a step in the winding of the film is effected, he has still to wait, after this next operation of the button, for the red shutter light to go on and off before he should move the camera. An example of an automatic camera with which our method may be practised is shown in our Patent No. 1,963,312, June 19, 1934, as contrasted with a partly automatic camera shown in our Patent No. 1,963,095, hereinbefore referred to.

Referring more particularly to the drawings showing portions of one type only of camera by which our invention may be practised, the lower box-like body 1 supports or receives a superstructure consisting of a hood 2 provided with lateral handles (not shown), so arranged that the camera as a whole is properly balanced in the operator's hands.

Fitted to the front of the hood 2 is a central extension 7 of a configuration adapting it to set close against and surround a group of meter dials or registers or other objects to be photographed. There are lateral openings 8 at the rear of the extension 7 adjacent to two lateral lamp chambers each containing an electric lamp 10 which are constantly illuminated while the camera is in use. The interior walls of the extension 7 are rendered reflecting. On the rear inclined wall of the hood 2 is a mirror 11 within a chamber 12 having an opening 13 at the front through which the image is seen through the mirror. Such image is cast downwardly through an opening 14 in the bottom wall 15 of the chamber to a lens tube 16 provided with a shutter indicated generally at 17. Such lens tube and shutter are desirably carried on a removable panel 18 and the tube projects through a suitable central opening 19 in the top wall 20 of the body box 1.

Fitting within the said body box 1 and slidably removable therefrom at the front is an inner box-like magazine 21 which carried the motor, film mechanism and operating gearing therefor.

A central exposure chamber 23 in the magazine is aligned vertically with the lens tube 16 that receives the image from the mirror 11 and projects it downwardly to an exposure opening 24 at the bottom.

At the left side of the camera, the magazine in conjunction with the box 1 (best shown in Fig. 2) forms a sensitized film feed chamber 25 and at the right (as viewed from the rear of the camera) a film winding chamber 26. The take-off spool or cartridge 27 of sensitized film is suitably mounted in the usual way in the chamber 25 and the take-up spool 29 is suitably mounted in the chamber 26.

The sensitized film, indicated at F in the drawings, passes laterally from the spool 27 over a guide roll 41, across the exposure opening 24, under a guide roll 40, over an idler roll 39, around and under a supporting roll 37, either turning freely or fixed on a shaft 38 mounted in the magazine walls, and thence to the winding spool 29.

The idler 40 is preferably fixed to the walls of the exposure chamber 23, but the idlers 39 and 41 are preferably carried between yoke arms 42 pivoted at 43 and spanned by a transverse plate 44 backing up the rear of the film opposite to the exposure chamber 24, and the whole constitutes a gate that may be swung from the operative position of Fig. 2 into an inoperative position, while loading the camera and threading the film, the magazine being removed from the box during such operation. The said gate is held in place by sliding spring latches 45 on the plate 44 which are released by pinching together the finger pieces 46.

The usual operating lever 47 (Fig. 9) for the shutter 17 is pivoted at 48 to the core 49 of a solenoid 50 mounted on the panel 18 and wired (as hereinafter more fully stated) to operate the shutter at the proper time. Also mounted on said panel 18 at opposite sides of the shutter are two standards 51 carrying lamps 52, one of which is shown in dotted lines in Fig. 1. These lamps project in proximity to two openings in the rear wall of the hood element 2, one of said openings being desirably fitted with a clear window and the other with a ruby window to constitute respectively the film signal and the shutter signal. One is wired, in a manner hereinafter described, to contact fingers 97 normally contacting with the idler 39 over which the sensitized film passes and the latter is wired to the shutter mechanism. Also, on the rear signal wall of the hood 2 is a main operating button (not indicated) adjacent to one of the lateral handles, so that the said button may be conveniently pressed by a thumb of the operator as he holds the camera before him in taking the picture as described.

Figure 9:
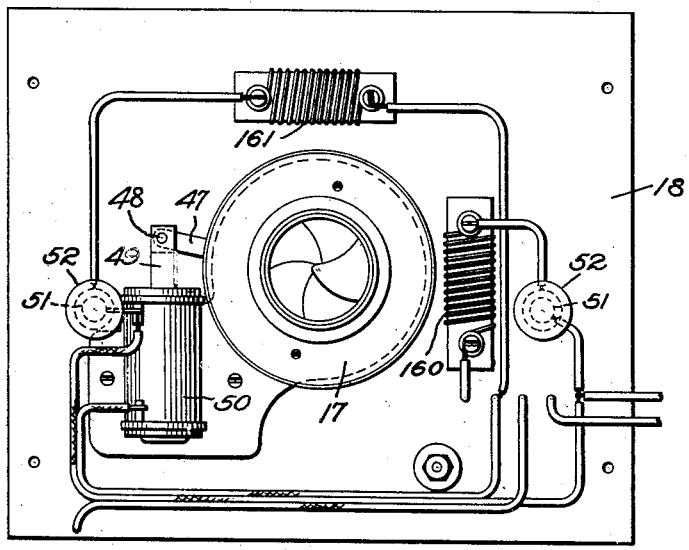
Fig. 9 is an enlarged top plan view of the bottom of the hood of the camera to show the control of the shutter.
Figure 10:
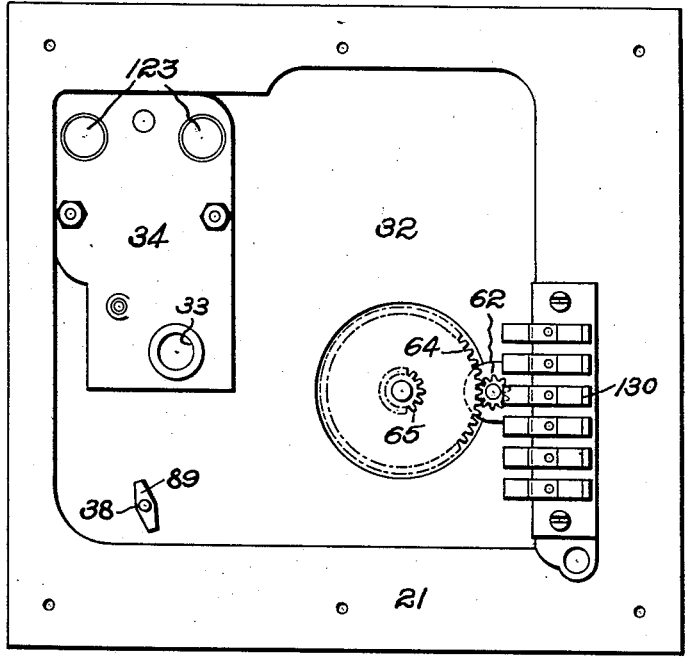
Fig. 10 is an elevation of the outer wall of the magazine and showing the master gear or cycle element, or cycle mechanism.

The prime mover for driving the camera consists of a motor, generally indicated at 56 (best shown in Fig. 2 and diagrammatically indicated in Fig. 9). Said motor is located in a chamber 25a above the film chamber 25 in the magazine 21. The vertical shaft of said motor communicates motion through worm gearing (not shown) to a shaft terminating in a driving pinion 62 (shown in Fig. 10).

The controlling mechanism is carried by a suitable cover plate fastened to the front wall of the magazine 21. Said controlling mechanism includes a master gear 64 (shown best in Fig. 10) driven by said pinion 62, and itself driving suitable gears not necessary more fully to refer to. Such gearing, collectively considered, we herein term the cycle element or cycle mechanism, because a cycle of movements thereof effects the successive operation of the camera parts in their proper order.

It is unnecessary to describe in detail all of the parts including the contact fingers of the motor circuit, and for further reference to the details of the said circuit we make reference to our said co-pending application Ser. No. 586,919, now Patent No. 1,963,095.

Movable with the shaft 38 (Fig. 2) at opposite sides of the supporting roll 37 are co-axially mounted disks provided with spurs 91 in line with the margins of the sensitized film and adapted to be driven by the film so as to rotate the shaft 38. The travel thereover of one picture area of the film controls contacts of the circuit.

The sensitized film (to which we will more specifically refer hereinafter) is, as heretofore stated, indicated generally at F in the several views. It is provided with a leader end F' and a trailer end F'' between which is the entire sensitized area of the film. The said leader end and the said trailer end are preferably paper members attached to the sensitized film. The said film F is so constructed that at points 95 on the leader end desirably close to the line of union with the beginning of the sensitized area of the film strip, and at points 96 desirably in the sensitized portion of the film strip but spaced by one picture area from the trailer strip F'', the said strip does not constitute an insulating means such as does the rest of the strip with reference to certain of the electrical contacts of the circuit. Thus it will be seen that the said sensitized film strip of the camera causes a change in an electric circuit of the camera when, in the unwinding of the sensitized film strip in use, a structural variation of the strip (shown in Fig. 4 as the openings 95 and 96) arrive at certain contacts of the said circuit. The shape and position of the openings 95, 96 may, of course, be varied or the same function could be performed by cutting away or narrowing the film at the desired point. The openings must be of sufficient length to deprive those portions of the film F of their insulating capacity for the necessary period.

As indicated most clearly in Fig. 2, the contact members 97 (only one of which is there shown) tend to rest on the roll 39 which forms an electrical connection between them in the absence of a sensitized film threaded through the magazine in the manner already described. Said two contact members 97 make the necessary contact with the roll 39 to cause the described change in the electric circuit when the cut-away portions or openings 95, 96 register with said contact members 97. Through the said contacts the white signal light referred to, indicating the position of the film is established.

The camera is connected with a source of current, as already indicated, through a plug fixture on the hood. The circuit arrangement and cycle of automatic operation will now be described with reference to the diagram of Fig. 11.

The object-illuminating lamps 10 are connected in parallel with the line circuit and will be illuminated continuously while the apparatus is plugged in as described. Besides the normal driving field 133 the motor 56 is provided with a field 138 which acts as a dynamic brake. When the apparatus is plugged into the line wire or source of electrical supply, a current reduced in volume by the variable resistance 140 immediately flows through the field 138 through circuit plus 132, wires 134, 135, motor 56, field 138, wire 139, resistance 140, wire 141, contact finger 72, contact finger 73, wire 142, wire 143, and back to the minus side of 132. Assuming that the leader end of the sensitized film F has been threaded into the camera as described and attached to the winding spool 29, the manual operating button referred to is pressed by the user, a circuit is established through the field 133 of the motor and the latter is set in motion through circuit plus 132, wires 134, 135, motor 56, field 133, wires 136 and 137, button 55, wire 143, back to 132, and the gearing heretofore referred to is set in motion.

For a more detailed reference to the structural features of the several circuits, reference is made to our said application Ser. No. 586,919, now Patent No. 1,963,095.

Until the opening or slitted portion 95 of the sensitized film strip leader end F' has passed over the roll 37, the contacts 97 are not insulated from the roll 39 and during such period a circuit is closed through the white signal light 53, referred to, in order to warn the operator that a picture area is not yet in front of the exposure opening. Such circuit is established through plus 132, wire 134, wire 145, lamp 53, wire 146, contacts 97, through roll 39, wire 143, and back to minus 132. When the sensitized film strip has progressed sufficiently to present a picture area, it insulates the contacts 97 from the roll 39 and the white light goes out.

The film strip is now in position for making the exposure and the sensitive portion thereof intermediate the leader end and the trailer end is of sufficient length to provide, within reasonable mechanical bounds, any desired number of picture receiving areas such as diagrammatically indicated at 92a in Figs. 5 and 7, one succeeding the other, so that when the film is developed, the photograph of the meter readings or other objects will appear along its length in the order in which they were taken. When the extent of the entire sensitized body has been substantially exhausted in this way (preferably leaving beyond the openings 96 sufficient sensitized area to constitute one picture area) the openings or cutaway portions 96 cross the measuring roll 37. Because of said cut-away portions 96, the film uncovers the contact members 97, causing them to contact electrically with roller 39 and complete the circuit through the film signal white window 53 as illuminated by the adjacent bulb 52. The showing of the white light at such time thus completes the effective passage of the film and indicates the same.

Until the film area is presented at the exposure opening, it is immaterial whether the shutter is operating or not, but once such presentation is made at the beginning of the succeeding cycle, a suitable operating cam or member acts to close the circuit between the contact fingers 82, 83, and operate the shutter as follows: plus 132, wire 134, wire 147, solenoid 50, wire 149, contact 82, contact 83, wires 150, 151, 142, 143, back to minus 132. At the same time, a parallel circuit is established from wires 149 and 147 through a wire 152, and red lamp signal 54, which latter is illuminated while the shutter is open and so held by solenoid 50 acting upon the shutter operating lever 47.

It is unnecessary to refer to the details involving the energization of the clutch winding member, but it is to be understood that due allowance is made for the fact that the winding roll is steadily increasing in diameter due to the accumulation of exposed film thereon, and therefore the rate of feed is increased with each revolution.

The resistance coils for the signal lamp 53 are provided at 160, 161 to admit of the use of low voltage filaments. The variable resistance 140 to the motor field 139 is adjusted to limit the current through the motor when used for braking.

It will be understood from the foregoing description that we utilize the sensitized film strip to control signalling means, to indicate the appearance at the exposure opening of the sensitized surface of the film, and also to indicate the disappearance of the sensitized surface from said exposure opening. Desirably that signalling means is the flashing of a light, functioning when the leading end of the sensitized surface appears at the exposure opening and again when the opposite end of the sensitized surface disappears from or is delivered past said opening, signalling means also indicating the operation of the shutter mechanism.

The sensitized film strip herein disclosed acts in the establishment of an electric circuit to indicate the relation of the sensitive surface to the exposure opening, as, for example, the presentation of the commencement end of the sensitized surface at the exposure opening and also the final withdrawal of the sensitized surface from the exposure opening, or to indicate the position of the film in the camera. The leader end indicated in the several figures at F' and the trailer end indicated at F'' are of some opaque substance such as paper, and are not provided with a sensitive surface. Said ends may be integrally formed or otherwise with the film strip proper, but in any case the exposures must not begin until the leader end F' has passed the exposure opening 24 and the exposures must cease as the trailer end F'' is reached.

It will be understood from the foregoing that in accordance with one use of the method of our invention we provide a signal, as, for example, the flashing of a white light, under the control of the sensitized film, to indicate the instant of the complete passing of the leader end, and also to indicate the completion of the passage of the sensitive surface of the film strip, which, being at once followed by the appearance of the trailer strip or end, presents a condition when the exposures must cease.

Obviously the signalling or other result from a change in the electric circuit may be effected from the sensitized film strip in various ways, nor is our art or method limited to the utilization of a sensitized film strip which itself acts as an insulator in the electric circuit. While in Figs. 4 and 5 the structural variations of the sensitized film strip are provided as openings therein, any structural variation of the sensitized film strip may be resorted to in carrying out our method, provided such a structural variation makes a change in the electric circuit in the unwinding of the sensitized film strip in use.

The line of union between the leader end or strip and the commencement of the sensitive surface of the film strip is indicated at X, and the termination of such sensitive surface is indicated at Y. Therefore, desirably though not necessarily, the openings 95 are provided just in front of the line of union X and the openings 96 are desirably just in advance of the line of union Y.

In accordance with our method, the signal (that is, the flashing of the white light) may be made to indicate each presentation of an exposure area and in such case the openings or other structural variations would be positioned at the proper point just in front of each new exposure area. Such construction is shown in Fig. 5, wherein openings are provided not only in the leader strip but also in the sensitized portion of the film at substantially the position of each new exposure area, as indicated at 95a, the first openings 95 and the final openings 96 being provided as in the construction shown in Fig. 4.

We may, instead of providing openings or notches in the sensitized strip, apply at suitable intervals to the surface of said strip a conductor of an electric circuit, this being another form or character of structural variation of the strip. Such a construction is shown in Figs. 6, 7 and 8, wherein the same reference characters used indicate the same parts.

Desirably, but not necessarily, just in advance of the line of union X, there is applied to one surface of the strip an electric conductor Z, and preferably just in advance of the line of union Y, there is provided a similar electric conductor Z, both of which are of sufficient width in a direction lengthwise of the strip to permit an effective completing of the circuit. Said conductor area Z may be of any suitable material adapted for the purpose, as, for example, a metallic foil adhesively applied by a flexible cement to the surface of the strip, which surface is preferably the non-sensitive surface thereof, but not necessarily so. We may, instead of using a metallic foil, employ a waterproof India ink which has a carbon base, or we may employ a metallic powdered paint with a non-insulating binder.

Instead of locating the conductor Z only as shown in Fig. 6 (which corresponds to the position of the openings in Fig. 4) we may provide a conductor of the character described, at the proper point just in advance of each unit exposure area. Such a construction is shown in Fig. 7 where the same reference characters are provided. However, instead of having a continuous sensitive surface, we may provide a series of sensitive surfaces on a face of the film strip, all spaced very slightly apart, and in the intervals therebetween place the conductors Z.

The circuit may be established in any suitable manner by means of an applied conductor, such as Z. For example, and as indicated diagrammatically in Fig. 8, we provide a two-part metallic roll 15', 16', the parts of which are insulated from each other, as at 17', and over or under which two-part roll the strip F is passed with the non-sensitive surface of the strip next to the said roll, so that when the conductor area Z arrives at the roll, the circuit is completed through the two parts 15', 16' of the roll, and the conductor areas Z. The circuit is diagrammatically indicated at 18' and includes a battery 19' and a signal light 20'. We do not in this application claim either the camera nor the film strip herein disclosed, since the same are respectively claimed in our Patents Nos. 1,963,095 and 1,963,096.

According to one possible use or practice of our method the camera will be moved quickly from in front of one object to be photographed to the next adjoining one, and during the brief interval in which the camera is so moved, the cycle element effects the feeding of each exposed area of the film strip past the exposure opening of the camera, so that the next exposure area is presented. Within the broad scope and purpose of our method, the signal could be made to indicate each presentation of an exposure area, which is desirable in some cases. The sensitized film strip herein disclosed, provided with one or more structural variations for the purpose stated, may be used photographically in its various sizes or lengths in any camera of the appropriate size adapted to receive a sensitized film strip, even though such camera is not provided with an electric circuit including a signal nor having electrical contacts which act to flash the signal only when a structural variation in the film permits the circuit to be completed through said contacts and the signal to be flashed. In such a camera, not provided with an electric circuit, etc., the sensitized film strip would act or be caused to act as an ordinary film, and such film would be moved step by step past the lens either by hand or by an automatic or partially automatic feed if the camera be provided therewith. The method herein claimed would not be practiced under such conditions.

Conversely, any camera that is provided with an electric circuit containing a signal and having suitably positioned contacts permitted to act by reason of a structural variation in the film herein disclosed, may be used in the practice of our method, whether or not the same be of the type of camera herein disclosed. In such other types of cameras, the film strip having the structural variation or variations might be fed by hand, or by power feed of any suitable sort.

In other words, the camera of Patent No. 1,963,095 may be used for photographic purposes without a sensitized film strip such as disclosed in Patent No. 1,963,096, and the film strip of said Patent No. 1,963,096 may be used for photographic purposes in cameras not included within the scope of the disclosure of Patent No. 1,963,095.

Having thus described the method of our invention and the preferred way of practicing the same, it is to be understood that although specific terms are employed, they are used in a generic and descriptive sense and not for purposes of limitation, the scope of the invention being set forth in the following claims.

We claim:

1. That improvement in the art of photography of the power-fed film strip type, for the purpose of ensuring accurate utilization of the sensitized area of the film strip in the taking of a series of pictures on said film strip, which includes producing a light for the purpose of signalling the presence of the commencement of the sensitized area at the lens of a camera, and utilizing the power-fed progress of the film strip itself to effect the production of said light as stated, whereby certainty of such signalling, and consequently a perfect record, are secured.

2. That improvement in the art of photography of the power-fed film strip type, for the purpose of ensuring accurate utilization of the sensitized area of the film strip in the taking of a series of pictures on said film strip, which includes producing a light for the purpose of signalling the presence of the commencement of the sensitized area at the lens of a camera and the final passage of said sensitized area past the said lens, and utilizing the power-fed progress of the film strip itself to effect the production of said light as stated, whereby certainty of such signalling, and consequently a perfect record, are secured.

3. That improvement in the art of photography of the power-fed film strip type, for the purpose of ensuring accurate utilization of the sensitized area of the film strip in the taking of a series of pictures on said film strip, which includes producing a light for the purpose of signalling the final passage of said sensitized area past the said lens, and utilizing the power-fed progress of the film strip itself to effect the production of said light as stated, whereby certainty of such signalling, and consequently a perfect record, are secured.

4. That improvement in the art of photographing with a film having a sensitized area of sufficient extent to provide for a number of exposures respectively at successive portions of said film in the presence of the lens of a photographic camera, and having non-sensitized leader and trailer ends for reception in such camera, and for the purpose of ensuring the accurate commencement and termination of said exposures with respect to the said leader and trailer ends, and therefore the correct utilization of the said film, which includes, moving said film for successive exposures past the lens of the camera; insulating by the film itself terminals of an electric circuit having therein a signal; interrupting said insulation by the structure of the film itself; and correlating such interruption with respect to an end of the said sensitized area, whereby said signal is caused to function at a time to warn the user of the camera of the position of one of said non-sensitized ends with respect to said lens.

5. That improvement in the art of photographing with a film having a sensitized area of sufficient extent to provide for a number of exposures respectively at successive portions of said film in the presence of the lens of a photographic camera, and having non-sensitized leader and trailer ends for reception in such camera, and for the purpose of ensuring the accurate commencement and termination of said exposures with respect to the said leader and trailer ends, and therefore the correct utilization of the said film, which includes, loading said film into the camera, insulating by the film itself terminals of an electric circuit having therein a signal, moving said film with respect to the lens of the camera until the said insulation is interrupted by the structure of the film itself, causing said interruption of the insulation to produce a signal through the agency of the electric circuit, and correlating such interruption of the insulation with respect to an end of the sensitized area of said film, whereby said signal is caused to occur at a time to warn the user of the camera of the position of one of said non-sensitized ends with respect to said lens.

6. That improvement in the art of photographing with a film having a sensitized area of sufficient extent to provide for a number of exposures respectively at successive portions of said film in the presence of the lens of a photographic camera, and having non-sensitized leader and trailer ends for reception in such camera, and for the purpose of ensuring the accurate commencement and termination of said exposures with respect to the said leader and trailer ends, and therefore the correct utilization of the said film, which includes moving said film for successive exposures past the lens of the camera; insulating by the film itself terminals of an electric circuit having therein a signal; interrupting said insulation by the structure of the film itself; and correlating such interruption with respect to the leading end of the said sensitized area, whereby said signal is caused to function at a time to warn the user of the camera of the position of said leading end of said sensitized area with respect to said lens.

7. That improvement in the art of photographing with a film having a sensitized area of sufficient extent to provide for a number of exposures respectively at successive portions of said film in the presence of the lens of a photographic camera, and having non-sensitized leader and trailer ends for reception in such camera, and for the purpose of ensuring the accurate commencement and termination of said exposures with respect to the said leader and trailer ends and therefore the correct utilization of the said film, which includes moving said film for successive exposures past the lens of the camera; insulating by the film itself terminals of an electric circuit having therein a signal; interrupting said insulation by the structure of the film itself; and correlating such interruptions with respect to the terminal end of the said sensitized area, whereby said signal is caused to function at a time to warn the user of the camera of the position of said terminal end of said sensitized area with respect to said lens.

8. That improvement in the art of photographing with a film having a sensitized area of sufficient extent to provide for a number of exposures respectively at successive portions of said film in the presence of the lens of a photographic camera, and having non-sensitized leader and trailer ends for reception in such camera, and for the purpose of ensuring the accurate commencement and termination of said exposures with respect to the said leader and trailer ends and therefore the correct utilization of said film, which includes moving said film for successive exposures past the lens of the camera; insulating by the film itself terminals of an electric circuit having therein an electric signal; and interrupting said insulation by structural variations of the film itself, so correlated with respect to both the commencement end and the terminal end of the said sensitized area of the film that said signal is caused to act at times to warn the user of the camera of the position of both the commencement end and the terminal end of the sensitized area with respect to said lens.

WILLIAM H. PETIT.
EDSON S. HINELINE.